(No Model.)
J. H. STEELE.
ELEVATOR FOR PUG MILLS.
No. 418,962. Patented Jan. 7, 1890.
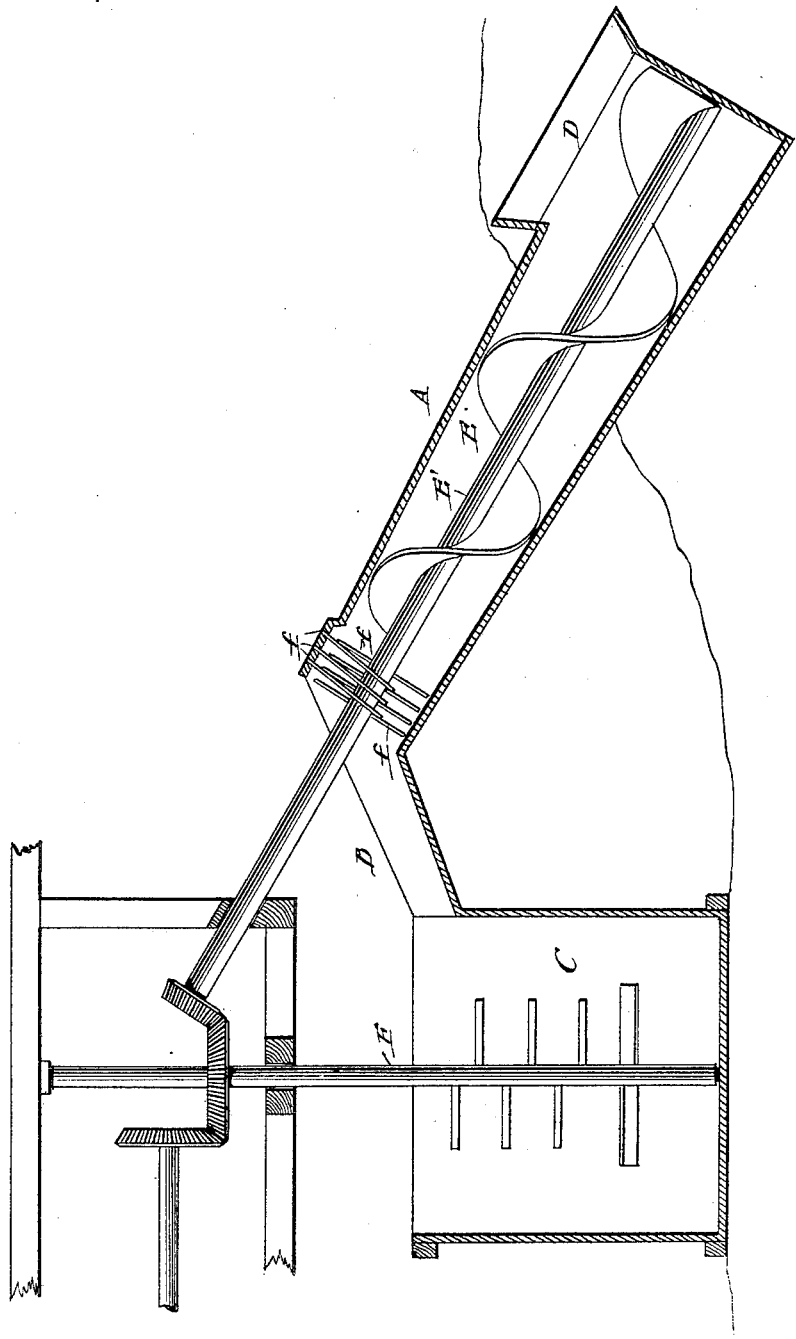
WITNESSES:
INVENTOR
BY
ATTORNEY

UNITED STATES PATENT OFFICE.

JAMES H. STEELE, OF BUTTE CITY, MONTANA.

ELEVATOR FOR PUG-MILLS.

SPECIFICATION forming part of Letters Patent No. 418,962, dated January 7, 1890.

Application filed April 19, 1889. Serial No. 307,660. (No model.)

*To all whom it may concern:*

Be it known that I, JAMES H. STEELE, of Butte City, in the county of Silver Bow and State of Montana, have invented a new and Improved Mud-Elevator for Brick-Machines, of which the following is a full, clear, and exact description.

The object of my invention is to provide an elevator for conveying mud to the mud-mill of brick-machines, which elevator or conveyer will slightly compress the mud as it passes up from the hopper and will clear the mud of stones and other hard foreign substances.

Reference is to be had to the accompanying drawing, forming a part of this specification, in which the figure is a longitudinal sectional elevation showing my new mud-elevator attached to a mud-mill.

A represents the elevator tube or conduit, set at an angle and attached by the spout B, or otherwise, to the mud-mill C. The lower end of the conduit A is formed with a hopper D, which is below the surface of the ground and into which the material is dumped. The conduit A is slightly tapering, growing gradually smaller from the hopper to the discharge end, so that the material while being lifted or carried up by the conveyer-worm E is at the same time carried into a gradually-diminishing space, which serves to compress the material into more compact form. The conveyer is composed of the shaft E' and the said conveyer-worm E, attached to said shaft. The width of the worm gradually diminishes from its lower end toward its upper end to conform to the taper of the conduit A.

$ff$ are stationary rods at the upper discharge end of the conduit A, between which the material is forced, and these rods thus serve to retain stones and other hard foreign substances and prevent them from entering the mud-mill.

The shaft E' and worm may be turned by any suitable means; but I prefer to gear them with the vertical shaft F of the mud-mill, as shown.

Having thus described my invention, what I claim as new, and desire to secure by Letters Patent, is—

The conduit A, having the hopper D at its lower end and the rods $ff$ at its upper end, in combination with the shaft E' and worm E, substantially as described.

JAMES H. STEELE.

Witnesses:
 THEODORE M. CARR,
 SIMON JACOBS.